United States Patent
Hopkins, Sr.

(10) Patent No.: US 7,109,455 B2
(45) Date of Patent: Sep. 19, 2006

(54) MICROWAVE COOKING CONTAINER WITH 2-POSITION INVERTED DOME LOCKS

(75) Inventor: Gary L. Hopkins, Sr., Scottsburg, IN (US)

(73) Assignee: Steamway Franchise Sales, Inc., Scottsburg, IN (US)

( * ) Notice: Subject to any disclaimer, the term of this patent is extended or adjusted under 35 U.S.C. 154(b) by 0 days.

(21) Appl. No.: 10/941,397

(22) Filed: Sep. 15, 2004

(65) Prior Publication Data

US 2006/0054619 A1   Mar. 16, 2006

(51) Int. Cl.
H05B 6/80 (2006.01)

(52) U.S. Cl. .................. 219/734; 219/735; 220/4.24

(58) Field of Classification Search ............ 219/734, 219/735, 729; 426/234, 107, 109, 113; 220/793, 220/781, 782, 367.1, 319, 790, 784, 4.24, 220/780, 785; 206/508–509, 459.1; 99/422, 99/425, 446; 62/112, 457.6
See application file for complete search history.

(56) References Cited

U.S. PATENT DOCUMENTS 6,559,431 B1    5/2003   Hopkins
6,789,393 B1 *  9/2004   Dais et al. ................ 62/457.6
2003/0155354 A1 * 8/2003   Tucker ...................... 220/4.24

* cited by examiner

*Primary Examiner*—Quang Van
(74) *Attorney, Agent, or Firm*—Carrithers Law Office, PLL; David W. Carrithers

(57) ABSTRACT

An end user container for food in refrigerated storage and subsequent microwave cooking is made of a thermo-plastic material transparent to radiant energy. The lid and tray are thermo-formed pieces and incorporate latches as integral features in the respective parts. They are arranged with a post-in-socket capability for latching the lid to the tray in a position which will permit venting of the interior of the container assembly to the exterior. The rims of the tray and lid are formed to enable pressing them together providing a surface sealing between the tray and lid along engaging wall portions of the lid and tray continuously around the container. Also, the lid has a bottom cooperating with the wall to provide a well, and the wall of the tray is outwardly turned, providing a step or ledge near the top of the tray and extending out to the upper wall portion, forming a part of the rim and which engages the well wall when the container is closed to the seal condition. When it is in the venting condition, the latches enable a perimeter space between those walls and around the entire container.

32 Claims, 5 Drawing Sheets

MICROWAVE COOKING CONTAINER WITH 2-POSITION INVERTED DOME LOCKS

BACKGROUND OF THE INVENTION

This invention relates generally to food cooking apparatus and more particularly to a plastic container useful for cooking food in a microwave oven and also for containing and storing food before and/or after cooking, in a refrigerator or freezer.

Some container systems for such purposes have been devised and produced. Some incorporate features intended for enabling controlled release of steam developed in the food during the cooking by microwave. An example is disclosed in my U.S. Pat. No. 6,559,431 B2 issued on May 6, 2003. The present invention represents another approach to achieving that type of functionality.

SUMMARY OF THE INVENTION

Described briefly, a container according to the illustrated embodiment of the present invention, comprises a tray and a lid for it. The tray is a single piece of formed plastic material. Similarly, the lid is a single piece of formed plastic material. Each of them is somewhat dished, having a wall portion extending up from a bottom portion and having a rim extending outward from the top of the wall, and a skirt projecting downward from the rim. The wall of the tray has a lower portion and an upper portion. The wall of the lid is about the same height as the upper portion of the wall of the tray, a height which is less than the height of the lower portion of the tray wall, such that the tray is deep dished compared to the lid. The rim of the lid, together with the wall and skirt of the lid, forms a downwardly-opening channel shaped to receive and fit the rim of the tray in a water-tight sealed relationship of the lid wall and the upper portion of the tray wall.

The wall of the tray is stepped at the transition from the lower wall portion to the upper wall portion, to provide an upwardly-facing ledge or shelf which can be engaged by the peripheral portion of the underside of the bottom portion of the lid to provide a water-tight face seal at the ledge around the perimeter of the lid bottom.

The assembly of the lid and tray may be symmetrical with respect to a vertical plane through the assembly. The lower wall portion of the tray is shaped at locations remote from each other so that the ledge is more extensive inwardly into the interior of the tray at these remote locations. The material of the ledge is formed at each of these locations to enable mating and latching with material of the lid bottom formed in registry with these locations on the tray.

The latching is such as to retain the lid to the tray at times when the lid is installed on, or has been moved from the water-tight sealing condition to a venting condition relative to, the tray.

The lid bottom, together with the wall of the lid, provides a shallow well sized to receive and fit the bottom of the tray.

A method according to an aspect of the invention can enable a user to place food in the tray and cover it by installing the lid and pressing the lid down enough to engage the latches, and cook the food in a microwave oven. A method according to another aspect of the invention is to press the lid down hard enough to tightly to close and seal the food-containing tray and lid of the container and store it. A method according to another aspect is to place the tightly sealed container in a microwave oven and cook the food. A method according to another aspect is to keep the container sealed while cooking and, upon attainment of a predetermined pressure, enable venting of steam while continuing to cook, while retaining the lid in latched condition on the tray.

DESCRIPTION OF THE ILLUSTRATED EMBODIMENT

Figure 1:
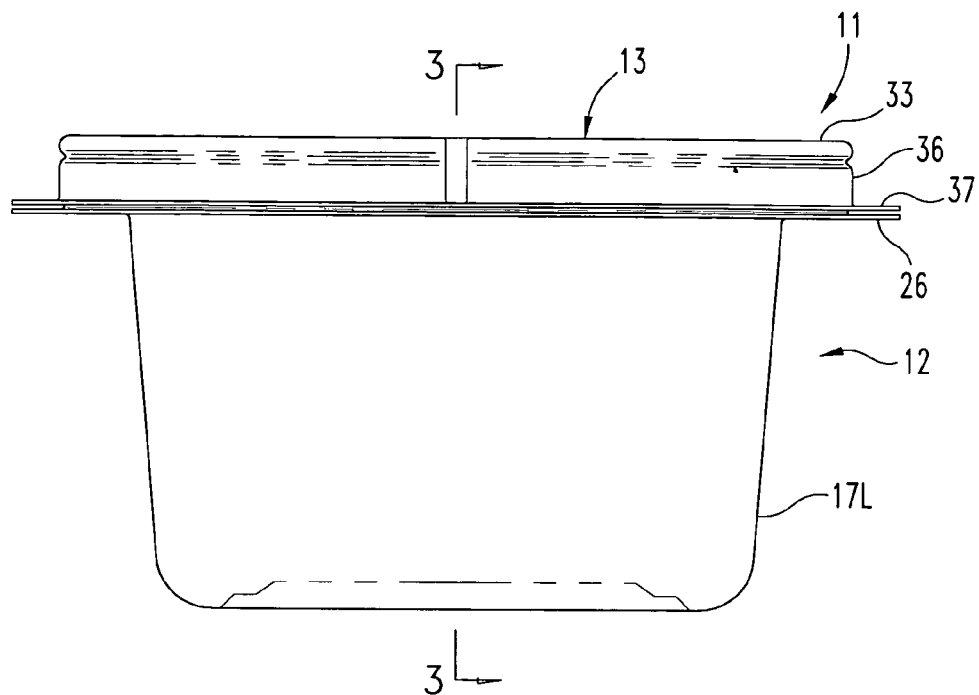
FIG. 1 is a front elevational view of a tray and lid assembly incorporating the present invention and in the closed and sealed condition.

Referring now to the drawings in detail, the container assembly 11 includes a tray 12 and lid 13 mounted to the tray. The container is an integral body of thermo-formed food-grade plastic material. Similarly, the lid is an integral body of thermo-formed food-grade plastic material. The material is transparent to radiant energy for effective use in a microwave oven. For the tray, the material is formed with a bottom 14 which extends outward from a raised central portion 16 and curves upwardly into a lower wall portion 17L which extends upwardly and slightly outwardly and then horizontally outwardly forming a ledge 18 which extends outwardly and then upwardly into an upper wall portion 17U which turns outwardly at 19 to form a rim 21 which extends outwardly and then downwardly at 22 to form a skirt 23 and turns outwardly at 24 providing a lip 26.

Figure 5:
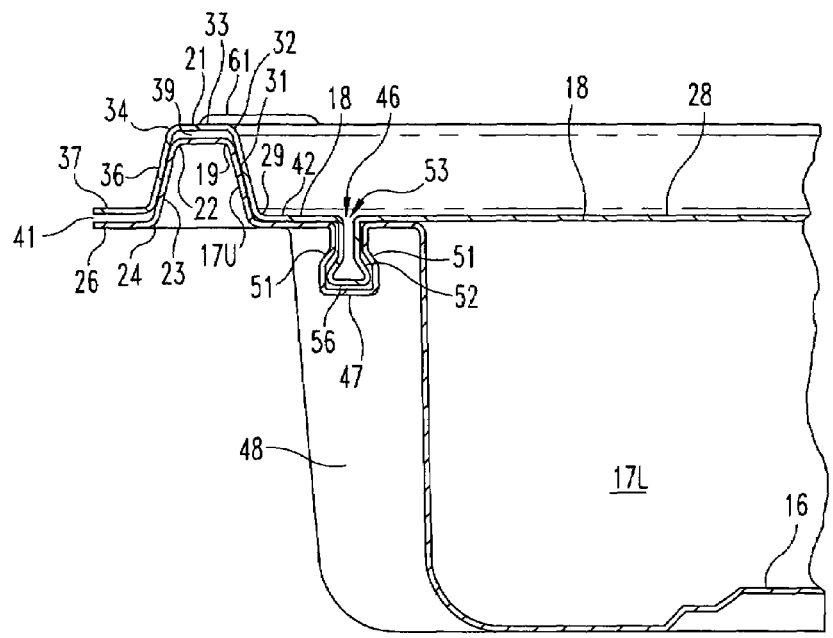
FIG. 5 is an enlarged section taken at line 5—5 in FIG. 2 and viewed in the direction of the arrows and showing the assembly in the sealed condition.
Figure 6:
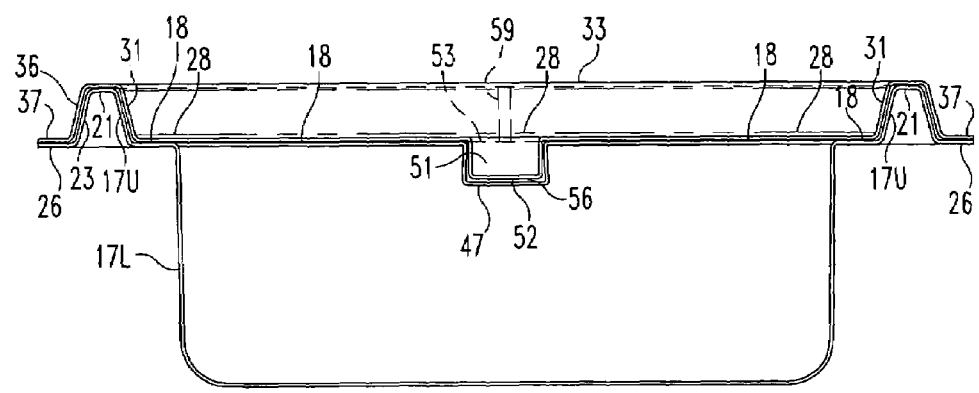
FIG. 6 is a section taken at line 6—6 in FIG. 2 and viewed in the direction of the arrows and showing the assembly in the sealed condition.

Similarly, the lid 13 has a bottom panel 28 which extends outward and then turns upward at 29 forming an inner wall 31 which extends upwardly and, together with the bottom panel, forms a shallow well. The material turns outwardly at 32, forming a rim 33, which extends outwardly. Then the material turns downwardly at 34, forming an outer wall 36, and a lip 37 at the bottom of the skirt. As best shown in FIGS. 5 and 6, the walls 31 and 36 of the lid converge and are complementary to the converging walls 17U and 23 of the tray, such that the rim of the tray is nested in downwardly opening channel formed by the rim of the lid, providing a snug friction fit of the lid on the tray. A small gap 39 is provided between the top of the tray rim and the underside of the top of the lid rim. There is also a gap 41 between the tray lip 26 and the rim lip 37. Thus, when the lid is assembled to the tray and pushed down tightly into the sealing condition shown in FIGS. 1, 5 and 6, the converging faces of the engaging wall portion 17U of the tray and 31 of the lid are wedged together in the downwardly opening channel provided by the lid, and provide a water-tight face seal at that location. Also, it is expected that engagement of the outer portion of the bottom panel 28 of the lid on the ledge 18 of the tray in the area 42 around the perimeter of the bottom well 28 in the lid will provide a water-tight seal at that location, as well as along the engaging surfaces 31 and 17U of the lid and the tray, respectively.

Figure 2:
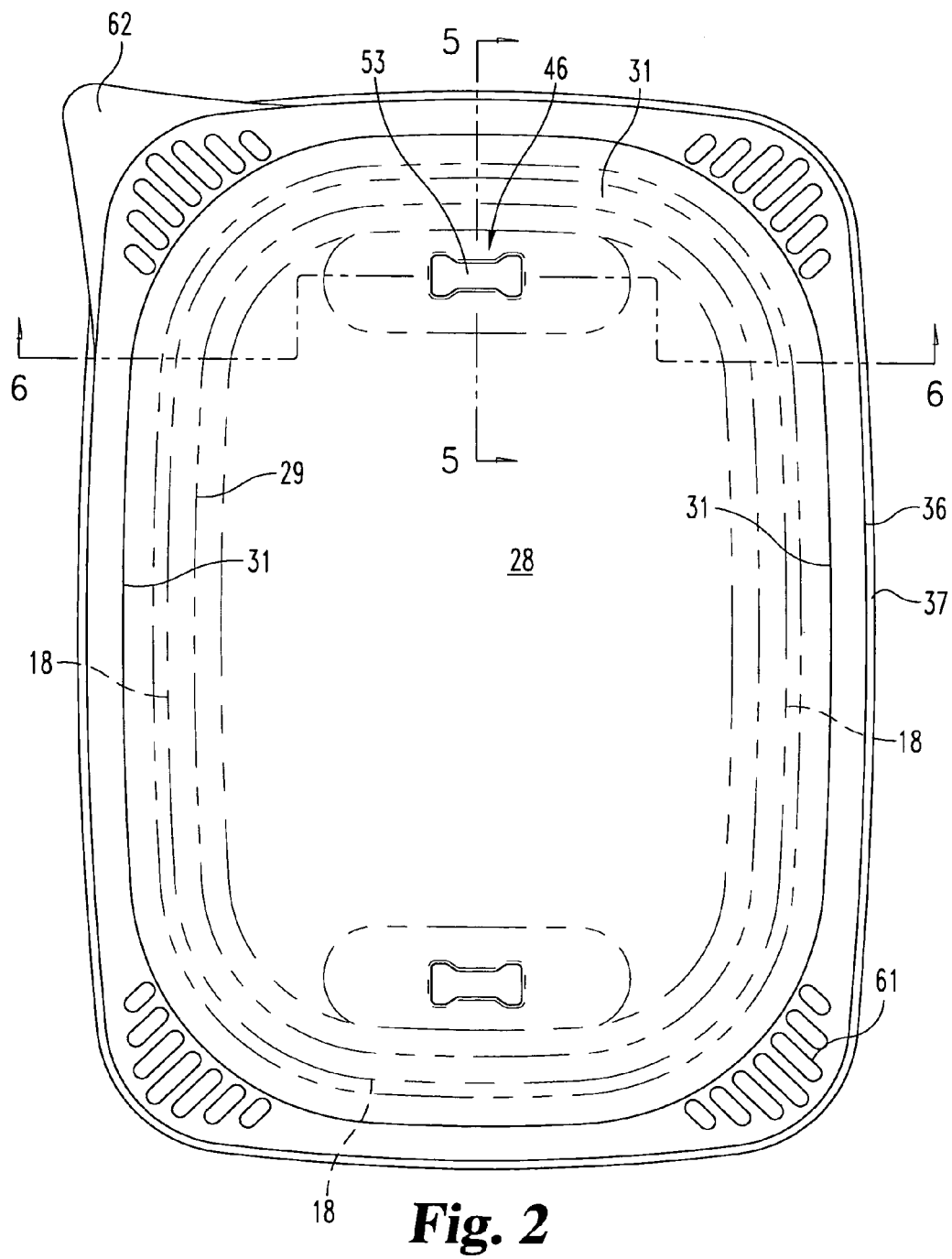
FIG. 2 is a top plan view thereof
Figure 3:
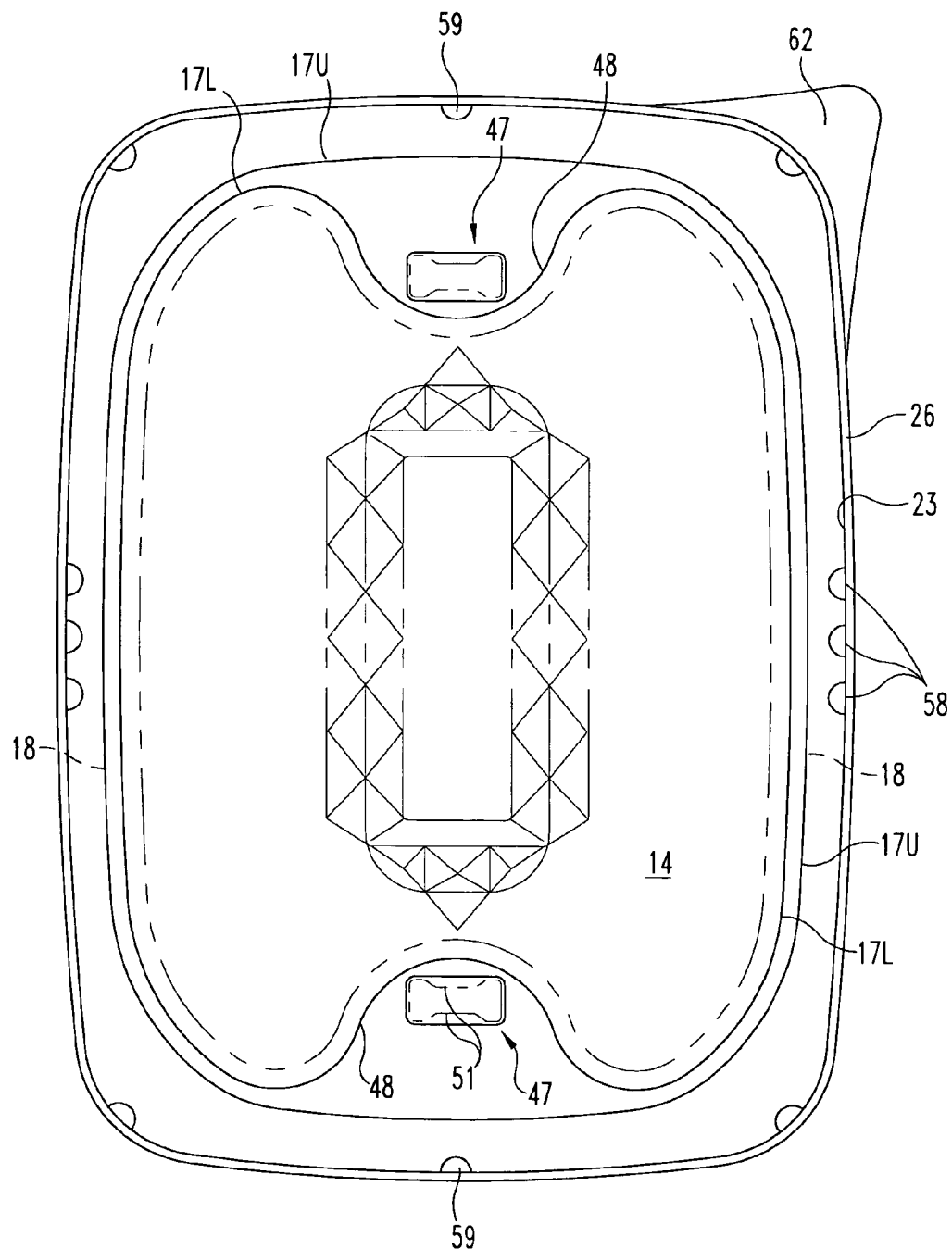
FIG. 3 is a bottom plan view thereof.
Figure 7:
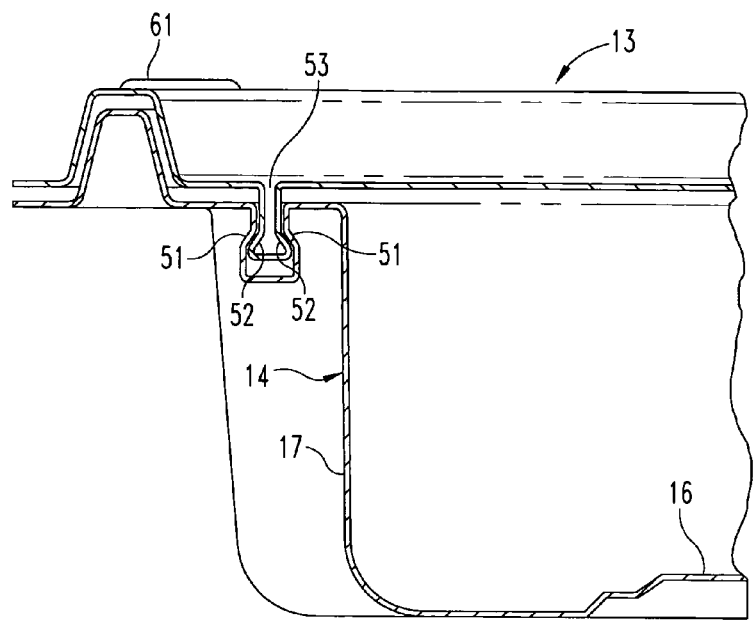
FIG. 7 is a section like FIG. 5 except showing the components in the venting condition.

As shown in FIG. 2, there are two dog-bone shaped recesses 46 in the bottom portion 28 of the lid, one near each end, thus remote from each other and in a plane of symmetry of the container. As shown in the bottom view of the assembly in FIG. 3, there is a dog-bone shaped feature at locations 47 near the opposite ends of the tray. These features are recesses projecting downward from a portion of ledge of the tray as best shown in FIG. 5. These recesses in the lid and tray might be referred to as "inverted domes". As indicated in FIGS. 3 and 5, the lower portion 17L of the tray wall at the ends of the tray is formed inward at 48 toward the center of the tray to provide sites for latching the lid to the tray. More specifically, as shown best in FIG. 5, the exterior of the recess 46 formed in the lid becomes a latching post and the recess 47 formed in the tray becomes a latching socket. As shown in FIGS. 3 and 5, the socket wall is formed inward at 51 to narrow the gap at the entrance to the recess 47. Similarly, the lid recess 46 is larger at 52 than it is at 53. Thus, the upper portion of the post can be referred to as the stem and the lower portion 52 can be referred to as the head of the lid latch. Because the materials of the lid and of the tray are flexible, manual pressing of the portion of the lid downward at the location of the recess 46 will enable the pushing of the post head 52 through the socket entrance to latch the lid onto the tray. As soon as the head 52 passes the walls 51 of the socket, the lid is latched. The relationship of the parts in this condition is shown in FIG. 7.

When it is desired to seal the lid to the container for a water-tight seal, the top of the rim of the lid is pressed down onto the tray all around the lid, whereupon the wedging action of the lid channel onto the tray rim is achieved, as described above. However, as shown in FIG. 5, there remains a gap 56 between the bottom of the post head and the bottom of the socket so that the two latching devices at the opposite ends of the container assembly do not prevent pushing the lid down into the fully wedged and sealing engagement of the lid with the tray when it is desired to seal the assembly.

As shown in FIG. 3 of the drawings, there are three V-shaped indentations such as 58 in the skirt 23 of the tray and one such indentation 59 in the skirt at each end of the tray. These are all in the general shape as shown at 59 in FIGS. 6 and 8. These terminate at the lip of the skirt but do not project into the lip and thus do not impact the integrity of the lip around the perimeter of the lip. Also, at the corners of the lid rim, there is a set of indentations 61 which, being indented from below the rim project slightly upward as at 61 in FIGS. 5 and 7. Also, as shown in FIG. 2, there is a pull tab 62 extending from the lip of the lid at one of the corners for easier opening of the container.

OPERATION

Figure 4:
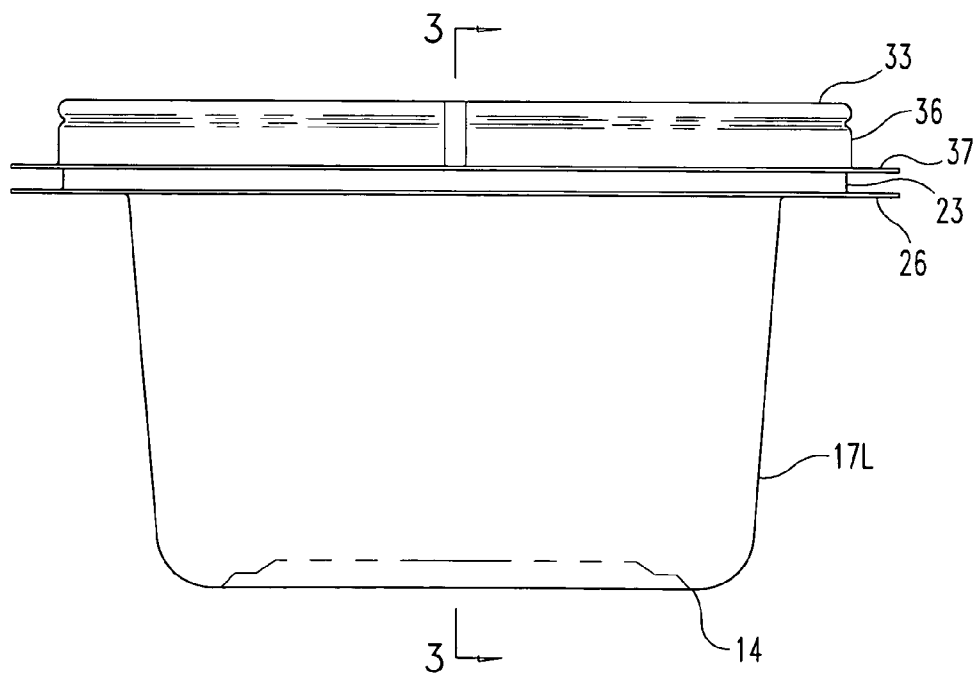
FIG. 4 is a front elevational view thereof but in the steam venting condition.
Figure 8:
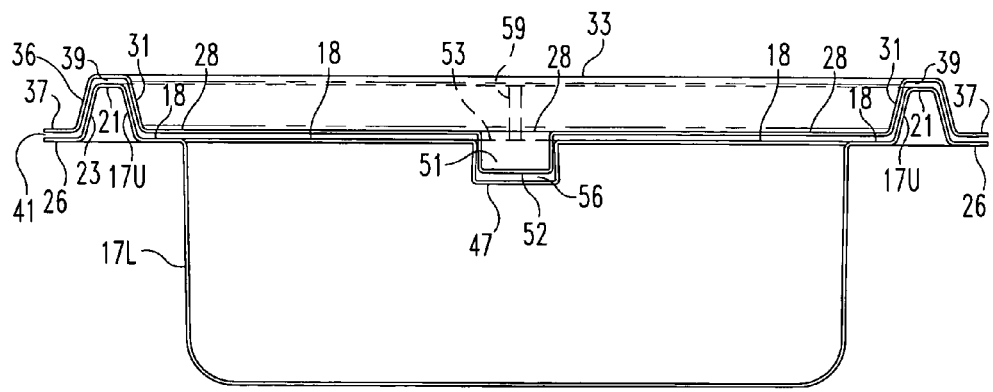
FIG. 8 is a section like FIG. 6 except showing the components in the venting condition.

In the use of the container, the food is placed in the tray. Then the lid is placed on top of the tray and pushed down slightly to force the heads of the latches past the narrow entrances and into the sockets. This step is accompanied by an audible snap. At this point the lid is in the "vented" position relative to the tray as shown in FIGS. 4, 7 and 8. When in this condition, the assembly is ready to cook the food in a microwave oven.

If a water-tight seal is required or desired for food storage, the consumer simply pushes down the top of the lid rim, thereby wedging the tray rim into the downwardly opening channel of the lid rim. This will achieve the water-tight seal between face of the upper wall portion 17U of the tray and the face of the lid wall portion 31 of the lid, continuously around the container assembly. A water-tight seal can also be obtained between the underside of the lid bottom 28 and the top surface of ledge 18 continuously around the tray. In the sealed condition, the container assembly can be used to store foods at room temperature, or refrigerated or frozen. Of course it can be used for other purposes, if desired.

When the consumer is ready to cook the food, regardless of whether it has been merely refrigerated or frozen, the sealed container can be placed directly into the microwave oven for no-hassle, quick and convenient cooking.

During the cooking process, the tray and lid are subjected to pressure resulting from steam and, to some extent, other gases developed during the heating of the food. As a result of this, cook time can be reduced, helping retain nutrition value and moisture in the food. Thus, it functions as a mini-pressure cooker.

If the pressure in the container rises above approximately one pound per square inch (psi) the lid will rise to return toward the vented position shown in FIGS. 4, 7 and 8. When this occurs, steam in the container can pass along the ledge around the perimeter of the container, up between the previously sealing walls 17U and 31, across the top of the tray rim at the sides and ends and at the lid corner indentations 61, down through the tray skirt indentations 58 and 59 and the space between the tray and lid skirts 23 and 36 and out between the lips 26 and 37.

The raised floor assists in providing even temperature throughout the food and can be provided in various configurations and embossment patterns to suitably support the food above the lowermost portion of the container bottom.

It should be noted that the latching system incorporating the formed recesses in the lid and in the tray, and providing post-in-socket latching, will retain the lid on the container as and when pressure rises high enough in the container to un-wedge the lid from the container. Therefore, there is no chance of inadvertent removal of the lid by pressure build-up. Instead, the lid can be manually removed easily by the consumer using the tab 62, or otherwise, when ready to remove the food from the container.

As one example of various possible materials for use in practicing this invention, a quality food-grade plastic co-polymer polypropylene can be used. The material thickness will depend somewhat on the material and the size of the container. An example for the tray and lid for a one-quart container may be 0.040 to 0.050 inches for the box and 0.020 to 0.030 inches for the lid. This would be considered a heavy duty reusable container, able to handle repeated cleansing in an automatic dishwasher while withstanding the repeated use in a high powered microwave oven.

In addition to the containerizing and cooking performance of the containers according to the present invention, the empty trays can be stacked for shipping and storage, as can the lids. Also, the lid wall 31 cooperates with the lid bottom 28 to form a well which is sized to conveniently receive the bottom of the tray. Thus, when the lid is removed from the tray by the user and placed on a level surface, the bottom of the tray can be placed and rested in the well of the lid. Also, a plurality of identical closed container assemblies containing food can be stacked reliably. This facilitates the stacking of filled containers in a refrigerator, or freezer or elsewhere, without risk of a higher stacked container sliding off the one below it.

While the invention has been illustrated and described in detail in the drawings and foregoing description, the same is to be considered as illustrative and not restrictive in character, it being understood that only one embodiment of the invention has been shown and described and that all changes and modifications that come within the spirit of the invention are desired to be protected.

What is claimed is:

1. A container for storage and cooking food comprising:
a hollow body of material formed into a bottom and a perimeter wall extending upward from the bottom and thereby providing an upwardly opening tray;
said wall having a lower portion and an upper portion with each portion having an inner surface and an outer surface;
said wall having a ledge extending outward from the inner surface of said lower wall portion to the inner surface of said upper wall portion;
said upper wall portion continuing upward from the ledge to a level where said material is turned outward to form a perimeter rim of the tray;
said rim extending outward to a transition region where said material is turned downward to form a perimeter skirt of the tray encircling and spaced from said upper wall portion of said tray;
a second body of material formed into a panel and a perimeter wall extending upward from the panel and then outward to form a perimeter rim of the lid and then downward to form a perimeter skirt of the lid;
the perimeter wall and rim and skirt of the lid providing a downwardly-opening perimeter channel received on the rim of the tray and sealed to the tray by sealing engagement of a surface of said upper portion of the wall of the tray with a surface of said perimeter wall of said lid continuous around the perimeter of said perimeter wall of the lid;
means in said panel and said ledge for connecting said lid to said tray prior to establishing said sealing engagement comprising a projection in one of said panel and said ledge and a recess in the other of said panel and said ledger;
said projection and said recess being in registry when said tray rim is received in said lid channel to enable a post-in-socket relationship;
said projection and recess are shaped to admit said projection into said recess when forced together, and resist separation under force directed toward removal of said projection from said recess;
said projection extends downward from said panel and has stem portion proximate said panel and head portion remote from said panel;
said recess extends downward into said ledge and has a narrow entrance proximate said ledge wider chamber below said entrance; whereby
admission of said head through said entrance is resisted and removal of said head from said chamber is resisted.

2. The container in claim 1 and wherein:
said upper wall portion of said tray is wedged into said channel to establish said sealing engagement.

3. The container of claim 1 and wherein:
said upper wall portion and said perimeter wall of said lid are retained in sealing engagement by friction.

4. The container of claim 1 and wherein:
said projection has an inside wall forming an upwardly-opening recess in said panel.

5. The container of claim 4 and wherein:
said tray including said recesses therein is formed of a single homogeneous body of thermoplastic material.

6. The container of claim 4 and wherein:
said lid including said recesses therein is formed of a single homogeneous body of thermoplastic material.

7. The container of claim 1 and wherein:
said recess in said ledge has an outside wall forming a projection extending downward from the underside of said ledge outside said lower wall portion.

8. The container of claim 1 and wherein:
there are at least two of said projections spaced remote from each other in said container, and at least two of said recesses in said container and in registry with said projections.

9. The container of claim 8 and wherein:
said projections are in a vertical plane of symmetry in said container.

10. A container for cooking food in a microwave oven comprising:
a tray having at least one sidewall and a bottom and a rim defining the top of the sidewall, the rim extending outward from the sidewall and then downward in the form of a skirt having an outwardly extending perimeter lip;
a lid having at least one sidewall and a bottom and a rim defining the ton of the lid sidewall and extending outward from the sidewall and then downward in the form of a skirt,
the sidewall, rim and skirt of the lid defining a downwardly opening channel of the lid received on the rim and sidewall of the tray, with the sidewall of the rim sealed on the sidewall of the tray continuously around the perimeter of the sidewall of the tray and retaining the lid on the tray;
latching means on said lid and said tray and normally disposed in position enabling said lid to become unsealed upon development of a predetermined pressure in said container while sealed, but positioned to retain said lid on said tray upon development of said predetermined pressure to permit escape of steam from inside said container to control pressure in said container while retaining said lid on said container; and
said predetermined pressure is one pound per square inch.

11. The container of claim 10 and wherein:
said container is made of an integral body of thermoformed co-polymer polypropylene food grade quality plastic material.

12. The container of claim 10 and wherein:
said lid is made of an integral body of thermo-formed co-polymer polypropylene food grade quality plastic material.

13. The container of claim 10 and wherein:
the lid has a plurality of channels in the rim extending outward from the side wall at the rim to the skirt to provide gas-venting passageways from the side wall across the rim to the skirt.

14. The container of claim 10 and wherein:
a portion of the bottom inboard from the sidewall is at a level above the level of the bottom at which the bottom turns upward into the sidewall.

15. The container of claim 10 and wherein:
the lid has an upwardly-facing well for receiving and framing the bottom of the tray when the lid is separated from the tray, whereby the tray can be partially nested in the lid.

16. A container for cooking food in a microwave oven comprising:
a tray having at least one sidewall and a bottom and a rim defining the top of the sidewall, the rim extending outward from the sidewall and then downward in the form of a skirt having an outwardly extending perimeter lip;

a lid having at least one sidewall and a bottom and a rim defining the top of the lid sidewall and extending outward from the sidewall and then downward in the form of a skirt, the sidewall, rim and skirt of the lid defining a downwardly opening channel of the lid received on the rim and sidewall of the tray, with the sidewall of the rim sealed on the sidewall of the tray continuously around the perimeter of the sidewall of the tray and retaining the lid on the tray;

latching means on said lid and said tray and normally disposed in position enabling said lid to become unsealed upon development of a predetermined pressure in said container while sealed, but positioned to retain said lid on said tray upon development of said predetermined pressure to permit escape of steam from inside said container to control pressure in said container while retaining said lid on said container;

said sidewall and bottom of the lid define a well in the lid;

said latching means include at least two upwardly opening sockets in the tray, and two downwardly projecting posts in the well of the lid; and the sockets and posts having normally-spaced abutments capable of interfering engagement upon pressure-initiated unsealing of said lid and said tray, to inhibit departure of said lid from said tray.

17. The container of claim 16 and wherein:

said tray is elongate, has sides and ends and has upwardly-facing shoulders at the ends, said shoulders are at level in the container between the bottom and the rim, and said sockets are located in said shoulders.

18. A container for cooking food in a microwave oven comprising:

a tray having at least one sidewall and a bottom and a rim defining the top of the sidewall, the rim extending outward from the sidewall and then downward in the form of a skirt having an outwardly extending perimeter lip;

a lid having at least one sidewall and a bottom and a rim defining the top of the lid sidewall and extending outward from the sidewall and then downward in the form of a skirt, the sidewall, rim and skirt of the lid defining a downwardly opening channel of the lid received on the rim and sidewall of the tray, with the sidewall of the rim sealed on the sidewall of the tray continuously around the perimeter of the sidewall of the tray and retaining the lid on the tray;

latching means on said lid and said tray and normally disposed in position enabling said lid to become unsealed upon development of a predetermined pressure in said container while sealed, but positioned to retain said lid on said tray upon development of said predetermined pressure to permit escape of steam from inside said container to control pressure in said container while retaining said lid on said container;

said tray sidewall has an upwardly-facing ledge defining a tray sidewall lower portion blending into the tray bottom and a tray sidewall upper portion blending into the tray rim;

said latching means includes a post projecting downwardly from said lid and including a stem projecting downward from the lid and a head at the lower end of the post;

and said latching means includes an upwardly-opening socket having an entrance at said ledge and a chamber below said ledge;

said entrance is dimensioned to resist entry of said post head to said chamber and departure of said post head from said chamber;

the materials of said lid and said tray at said latching means are sufficiently deformable to enable elastic deformation of at least one of said head and said entrance for enabling said post to move through said entrance upon application of sufficient force in a direction tending to change the position of said lid relative to said tray.

19. The container of claim 18 and wherein:

the said deformation is sufficiently elastic to enable snap-action installation of said lid on said tray.

20. The container of claim 18 and wherein:

said materials and dimensions of said post head and said entrance are such as to require a force of at least 1 to 2 pounds at said post head in a direction tending to remove said post head from said chamber, to remove said post head from said chamber.

21. A container for cooking food in a microwave oven comprising:

a tray having at least one sidewall and a bottom and a rim defining the top of the sidewall, the rim extending outward from the sidewall and then downward in the form of a skirt having an outwardly extending perimeter lip;

a lid having at least one sidewall and a bottom and a rim defining the top of the lid sidewall and extending outward from the sidewall and then downward in the form of a skirt, the sidewall, rim and skirt of the lid defining a downwardly opening channel of the lid received on the rim and sidewall of the tray, with the sidewall of the rim sealed on the sidewall of the tray continuously around the perimeter of the sidewall of the tray and retaining the lid on the tray;

latching means on said lid and said tray and normally disposed in position enabling said lid to become unsealed upon development of a predetermined pressure in said container while sealed, but positioned to retain said lid on said tray upon development of said predetermined pressure to permit escape of steam from inside said container to control pressure in said container while retaining said lid on said container; and said predetermined pressure comprises a pressure necessary to raise said lid to return to a vented position.

22. The container for cooking food in a microwave oven of claim 21, wherein said predetermined pressure is one pound per square inch.

23. The container of claim 21 and wherein:

said sidewall and bottom of the lid define a well in the lid; and said latching means include at least two upwardly opening sockets in the tray, and two downwardly projecting posts in the well of the lid, the sockets and posts having normally-spaced abutments capable of interfering engagement upon pressure-initiated unsealing of said lid and said tray, to inhibit departure o said lid from said tray.

24. The container of claim 23 and wherein:

said tray is elongate, has sides and ends and has upwardly-facing shoulders at the ends, said shoulders are at level in the container between the bottom and the rim, and said sockets are located in said shoulders.

25. The container of claim 21 and wherein:

said container is made of an integral body of thermo-formed co-polymer polypropylene food grade quality plastic material.

26. The container of claim 21 and wherein:

said lid is made of an integral body of thermo-formed co-polymer polypropylene food grade quality plastic material.

27. The container of claim 21 and wherein:

the lid has a plurality of channels in the rim extending outward from the side wall at the rim to the skirt to provide gas-venting passageways from the side wall across the rim to the skirt.

28. The container of claim 21 and wherein:

a portion of the bottom inboard from the sidewall is at a level above the level of the bottom at which the bottom turns upward into the sidewall.

29. The container of claim 21 and wherein:

said tray sidewall has an upwardly-facing ledge defining a tray sidewall lower portion blending into the tray bottom and a tray sidewall upper portion blending into the tray rim;

said latching means includes a post projecting downwardly from said lid and including a stem projecting downward from the lid and a head at the lower end of the post;

and said latching means includes an upwardly-opening socket having an entrance at said ledge and a chamber below said ledge;

said entrance is dimensioned to resist entry of said post head to said chamber and departure of said post head from said chamber;

the materials of said lid and said tray at said latching means are sufficiently deformable to enable elastic deformation of at least one of said head and said entrance for enabling said post to move through said entrance upon application of sufficient force in a direction tending to change the position of said lid relative to said tray.

30. The container of claim 29 and wherein:

the said deformation is sufficiently elastic to enable snap-action installation of said lid on said tray.

31. The container of claim 29 and wherein:

said materials and dimensions of said post head and said entrance are such as to require a force of at least 1 to 2 pounds at said post head in a direction tending to remove said post head from said chamber, to remove said post head from said chamber.

32. The container of claim 21 and wherein:

the lid has an upwardly-facing well for receiving and framing the bottom of the tray when the lid is separated from the tray, whereby the tray can be partially nested in the lid.

\* \* \* \* \*